US011672206B2

(12) United States Patent
Maelfeyt et al.

(10) Patent No.: US 11,672,206 B2
(45) Date of Patent: Jun. 13, 2023

(54) BALER WITH NEEDLE OVERLOAD PROTECTION

(71) Applicant: CNH Industrial America LLC, New Holland, PA (US)

(72) Inventors: Kenny Maelfeyt, Vlissegem (BE); Bram Willem, Woumen Houthulst (BE)

(73) Assignee: CNH Industrial America LLC, New Holland, PA (US)

( * ) Notice: Subject to any disclaimer, the term of this patent is extended or adjusted under 35 U.S.C. 154(b) by 717 days.

(21) Appl. No.: 16/625,256

(22) PCT Filed: Jun. 19, 2018

(86) PCT No.: PCT/EP2018/066216
§ 371 (c)(1),
(2) Date: Dec. 20, 2019

(87) PCT Pub. No.: WO2018/234291
PCT Pub. Date: Dec. 27, 2018

(65) Prior Publication Data
US 2020/0146218 A1 May 14, 2020

(30) Foreign Application Priority Data
Jun. 20, 2017 (BE) .................................. 2017/5438

(51) Int. Cl.
*A01F 15/12* (2006.01)
*A01D 59/04* (2006.01)
(Continued)

(52) U.S. Cl.
CPC .............. *A01F 15/12* (2013.01); *A01D 59/04* (2013.01); *A01D 59/06* (2013.01); *A01F 15/0858* (2013.01); *A01F 15/145* (2013.01)

(58) Field of Classification Search
None
See application file for complete search history.

(56) References Cited

U.S. PATENT DOCUMENTS

| 2,606,047 | A | | 8/1952 | Hill et al. | |
| 2,760,429 | A | * | 8/1956 | Skromme | ........... A01F 15/0858 |
| | | | | | 100/19 R |

(Continued)

FOREIGN PATENT DOCUMENTS

| DE | 4309275 A1 | | 9/1994 | | |
| DE | 10244816 A1 | * | 4/2004 | ......... | A01F 15/0858 |

(Continued)

OTHER PUBLICATIONS

English translate (EP1493326A1), retrieved date Aug. 16, 2022.*

(Continued)

*Primary Examiner* — Matthew Katcoff
*Assistant Examiner* — Mohammed S. Alawadi
(74) *Attorney, Agent, or Firm* — Peter K. Zacharias (57) ABSTRACT

A baler including a needle yoke driven via a needle coupling device including a connection member pivotally mounted around a fixed pivot axis for swinging around the fixed pivot axis. The swinging corresponds to movement of the needle yoke. The connection member is cooperative with the needle yoke by (i) a shearbolt adapted to transfer a force from the connection member to the needle yoke during a forward movement and (ii) by a protrusion, formed at one of the connection member and the needle yoke, to abut against the other one of the connection member and the needle yoke during a backward movement of the needle yoke.

8 Claims, 9 Drawing Sheets

(51) Int. Cl.
*A01D 59/06* (2006.01)
*A01F 15/08* (2006.01)
*A01F 15/14* (2006.01)

(56) References Cited

U.S. PATENT DOCUMENTS

| | | | | |
|---|---|---|---|---|
| 2,981,174 | A * | 4/1961 | Freeman | A01F 15/145 100/21 |
| 3,416,825 | A * | 12/1968 | Nolt | A01F 15/145 289/13 |
| 3,419,300 | A * | 12/1968 | Nolt | A01F 15/14 289/13 |
| 3,482,866 | A * | 12/1969 | Eby | A01D 59/04 289/15 |
| 3,489,077 | A * | 1/1970 | Eby | A01F 15/12 100/19 R |
| 4,074,623 | A * | 2/1978 | White | A01F 15/145 100/31 |
| 4,117,775 | A * | 10/1978 | White | A01F 15/14 100/19 R |
| 4,161,097 | A * | 7/1979 | Vansteelant | A01F 15/145 56/343 |
| 4,372,588 | A * | 2/1983 | Vansteelant | A01F 15/145 289/8 |
| 5,782,175 | A * | 7/1998 | Schrag | A01F 15/0858 56/343 |
| 6,644,181 | B2 * | 11/2003 | Honhold | A01F 15/0858 56/343 |
| 9,585,311 | B2 | 3/2017 | Kraus et al. | |
| 9,883,633 | B2 * | 2/2018 | Demon | A01F 15/145 |
| 9,961,837 | B2 * | 5/2018 | Naaktgeboren | A01F 15/042 |
| 10,455,769 | B2 * | 10/2019 | Maelfeyt | A01F 15/0858 |
| 10,455,770 | B2 * | 10/2019 | Maelfeyt | A01D 59/06 |
| 10,945,379 | B2 * | 3/2021 | Naeyaert | A01F 15/145 |

FOREIGN PATENT DOCUMENTS

| | | | | |
|---|---|---|---|---|
| EP | 1493326 | A1 * | 1/2005 | A01F 15/145 |
| EP | 2944181 | A1 | 11/2015 | |
| EP | 3298883 | A1 | 3/2018 | |
| EP | 3298884 | A1 | 3/2018 | |
| FR | 2702925 | A1 | 9/1994 | |
| GB | 2079329 | A * | 1/1982 | A01F 15/145 |

OTHER PUBLICATIONS

English translate (DE10244816A1), retrieved date Aug. 16, 2022.*
International Search Report and Written Opinion for Application No. PCT/EP2018/066216 dated Aug. 21, 2018 (14 pages).

* cited by examiner

BALER WITH NEEDLE OVERLOAD PROTECTION

BACKGROUND OF THE INVENTION

The present invention relates to agricultural balers, and, more particularly, to balers comprising needles the operation of which is protected against overload.

Agricultural harvesting machines, such as balers, are used to consolidate and package cut crop material so as to facilitate the storage and handling of the crop material for later use. A baler, such as a large square baler or round baler, picks up the crop material and forms it into bales. On a large square baler, a pickup unit at the front of the baler gathers the cut and windrowed crop material from the ground. The pickup unit includes a pickup roll, and optionally may include other components such as side shields, stub augers, wind guard, etc. A packer unit is used to move the crop material from the pickup unit to a duct or pre-compression chamber. The packer unit forms a wad of crop within the precompression chamber which is then transferred to a bale chamber. For purposes of discussion, the charge of crop material within the pre-compression chamber will be termed a "wad", and the charge of crop material after being compressed within the main bale chamber will be termed a "flake". Typically such a packer unit includes packer tines or forks to move the crop material from the pickup unit into the pre-compression chamber. Instead of a packer unit it is also known to use a rotor cutter unit which chops the crop material into smaller pieces. A stuffer unit transfers the wad of crop material in charges from the precompression chamber to the bale chamber. Typically such a stuffer unit includes stuffer forks which are used to move the wad of crop material from the pre-compression chamber to the bale chamber, in sequence with the reciprocating action of a plunger within the bale chamber.

When enough flakes have been added and the bale reaches a full (or other predetermined) size, a yoke with a number of needles is activated to transfer twine through the plunger behind the last compressed flake of the bale to knotters which are actuated to wrap and tie twine, cord or the like around the bale while it is still in the bale chamber. The twine is cut and the formed bale is ejected out the back of the baler as a new bale is formed.

In conventional drive systems the knotters are driven by means of a drive shaft-gearbox combination or by a chain drive. When a knotting cycle is required the knotter assembly is coupled through a one-revolution clutch with the main drive which in turn drives the knotter assembly that is synchronized with the plunger. The needles are connected through a crank mechanism with the knotter shaft and hence are driven in a synchronized manner with the knotters. The first part of the sequence of the knotting cycle is used to bring the needles up towards the knotters where, after a certain degree of rotation of the knotter shaft, the different knotter functions start. This first part of the knotter shaft rotation is also used to bring home some functions of the knotter system that were placed in a park position at the end of the second knot sequence and disengagement of the knotter shaft drive since the needles reached home position.

Drive systems for the knotters and the needles typically include a safety/protection device, mostly a shearbolt or other link to break or slip if the drive system encounters a high resistance. A drawback of these safety/protection devices is re-engagement after activation of the safety/protection device. For example replacing a broken shearbolt can be cumbersome. A further problem encountered is related to the timing of activation of the safety/protection device, and in particular the position between the needles and the plunger. When the needles are not withdrawn from the bale chamber in time, the plunger with the new, to be compressed wad, will hit the needles causing damage to the needles and possibly to other parts and elements of the baler.

U.S. Pat. No. 4,117,775 in the name of Hesston Corporation describes a safety control linkage which will take over the withdrawal of the needles from the path of travel as the plunger continues in operation. The relationship between the linkage and the needles is such that the linkage has no effect on the needles when the needles are swung into operation by their driving mechanism. However, the linkage will come into play if the driving mechanism is failing and is unable to withdraw the tying needles in the normal manner.

WO2015/197203 in the name of the applicant addresses at least some of these problems and discloses an agricultural baler with a split drive of the needles and knotters by means of a latch system that controls the needle timing and drive and provides an integral safety mechanism. WO2015197203 discloses an agricultural baler including a bale chamber, a plunger configured to compress crop material in the bale chamber, a counter crank, a plurality of needles, and a pivoting latch system. The counter crank is drivingly coupled to the plunger. The plurality of needles is configured to deliver twine through the bale chamber. The pivoting latch system is drivingly coupled to both the counter crank and the needles. A knotter is activated when the needles reach a predetermined position. The latch system ensures that the needles are always withdrawn from the bale by the same drive that powers the plunger. Although such a system works well, a disadvantage is that relatively long connection arms are needed for realizing the coupling between the plunger drive and the needles.

The object of embodiments of the invention is to provide a baler with an improved safety/protection device.

SUMMARY OF THE INVENTION

To this end, the invention provides a baler comprising:
a bale chamber (26);
a plunger (30) configured to compress crop material in said bale chamber in order to form a bale;
a needle yoke (42) rotatable around a fixed pivot axis (122) and comprising a plurality of needles (36) configured to deliver twine through said bale chamber (26);
a plurality of knotters (34) configured to receive the twine from said plurality of needles;
a driving shaft (90) located above the bale chamber (26) and extending in a traverse direction of the baler;
a needle coupling device (100) configured to convert a rotation of the driving shaft (90) into a movement of the needle yoke (42) from a rest position to a twine delivery position and back;
characterized in that the needle coupling device (100) comprises:
a crank arm (112) attached to the driving shaft (90) and co-rotating with the driving shaft (90);
a drive rod (110) having a first end pivotally connected to the crank arm and having a second end;
a connection member (120) pivotally mounted around said fixed pivot axis (122) and pivotally connected at a second location to said second end of the drive rod (110) such that rotation of the driving shaft (90) is converted in a swinging of the connection member around said fixed pivot axis (122), the swinging corresponding to said movement of the needle yoke (42);

said connection member (120) being formed cooperatively with said needle yoke by providing:
- a shearbolt adapted to transfer a force from the connection member to said needle yoke during a movement from the rest position to the twine delivery position; and
- a protrusion, formed at one of the connection member and the needle yoke, to abut against the other one of the connection member and the needle yoke during a movement from the twine delivery position to the rest position.

The invention is based on the insight that the location of the shearbolt in the mechanism that drives the needles determines the reliability of the safety mechanism. In many balers, a shearbolt is provided at the PTO, or at least before the driving shaft. Since the driving shaft drives the needle yoke via a crank arm attached to the driving shaft, the skilled person will understand that the ratio between the force exerted to the drive shaft and the force exerted by the needle yoke on the needles highly depends on the position of the crank arm. The leverage of the crank arm to the drive rod is variable over time, and therefore the ratio between forces in the driving shaft and at the needle yoke is also variable. This means that in choosing a shearbolt with a predetermined shearing force, a compromise has to be made wherein the shearbolt is over-dimensioned for certain positions of the crank arm and/or is under-dimensioned for other positions of the crank arm. The needles connected to the needle yoke are pushed through the baling chamber, and the needles are therefore most likely to experience a blocking or overload. Therefore, the force exerted by the needle yoke to the needles is preferably monitored for overload. An overload at the needle yoke will inevitably be transmitted through the needle driving mechanism.

Using a driving shaft located above the baling chamber, e.g. the same drive shaft as the drive shaft used for driving the knotters, and providing a needle coupling device between this drive shaft and the needle yoke, allows to build a system with shorter connection arms compared to prior art solutions. This results in a more compact baler.

According to the invention a connection member is provided between the drive rod and the needle yoke. This connection member is pivotally mounted around the same axis as the needle yoke. Furthermore, the connection member is provided to make a swinging movement, when the driving shaft is driven, that corresponds to the forward and backward movement of the needle yoke from a rest position to a twine delivery position and back. Furthermore, according to the invention, a dual link is provided between the connection member and the needle yoke. A first link is formed directly or indirectly via a shearbolt, and is particularly configured to transmit a force from the connection member to the needle yoke in a forward movement of the needle yoke. The forward movement of the needle yoke corresponds to a movement from the rest position to the twine delivery position of the needle yoke. The second link is formed by a protrusion at one of the elements that is adapted to abute against the other of the elements in a backward movement. This dual link has several advantages, which are described hereunder.

By providing a shearbolt between the connection member and the needle yoke, it can be guaranteed that the force exerted by the needle yoke to needles does not cross a predetermined threshold, irrespective of the position of the driving rod and crank arm. In this context, it is noted that between the connection member and the needle yoke, there is no variable leverage since the swing of the needle of the connection member corresponds to the movement of the needle yoke. Due to this substantially constant leverage, the force exerted on the shearbolt directly corresponds to the force exerted by the needle yoke on the needles. This results in an improved protection of the needles against an obstruction.

The protrusion assures that the needles are directly retracted from the baling chamber. In particular, the protrusion assures that the needle yoke always moves back to its rest position, even when the shearbolt breaks. In an overload situation, when the needles are for example half way in the baling chamber and further movement is obstructed, the shearbolt could break thereby preventing the needles from damaging. However, by braking the shearbolt, further movement of needles, forward and backward, is prevented. Other mechanisms in the baler, for example the plunger, will typically not be stopped so that operation of the plunger continues and it is likely for the plunger to damage the needles when they are still in the baling chamber at the wrong moment in time. By providing the protrusion to one of the connection member and needle yoke, automatic and correct retraction of the needles from the baling chamber is obtained while maintaining a protection against overload via the shearbolt. These advantages are obtained with a driving mechanism having a fairly simple mechanical structure so that a reliable driving mechanism for needles is obtained. No separate needle retracting mechanism is to be provided.

Preferably, the needle coupling device further comprises a coupler configured to couple the connection member to the needle yoke via the shearbolt. The coupler can be formed as a connection rod. In such configuration, the crank arm is typically connected to the driving shaft via a one-rotation gearbox that only rotates the crank arm when predetermined conditions are fulfilled. Alternatively and preferably, the coupler is formed as a hook member which is positionable in a first coupling position in which a swing connection member engages the hook member during swing and in a second uncoupling position in which the swinging connection member does not engage the hook member during swinging. The coupler being formed as a hook member allows a mechanism wherein the driving shaft continuously drives the connection member, and wherein the needle yoke is only coupled to the connection member via the hook when a movement of the needles is wanted. In this context, it is added that the hook can be driven by a trigger. The trigger could for example be given based on a bale length measurement.

Preferably the coupler is attached to the needle yoke. Further preferably, a pen is mounted to the connection member, wherein the coupler is adapted for engaging with the pen in the first coupling position of the hook member. By providing the coupler on the needle yoke, and the pen on the connection member, the coupler stays in a fixed, rest position, as long as the trigger has not been given. This simplifies the mechanical structure of the system.

Preferably the pen is located on a pivotable element pivotally connected to the connection member via a pivot axis, wherein the shearbolt is provided at a distance from the pivot axis to fix the pivotable element and the connection member. The pivotable element significantly simplifies the replacement of the shearbolt after breaking. The shearbolt determines the angular orientation of the pivotable element with respect to the connection member in the fixed position. Independent from the position of the connection member, the relative position of the pivotable element with respect to the connection member can be reached. Therefore, it is not necessary anymore to manually force or drive the needle driving mechanism in a predetermined state for replacing the shearbolt. Namely, the pivotable element can be rotated into its desired position independent from the position of the connection member and independent from the position of the needle yoke. This significantly reduces the efforts for replacing the shearbolt.

Preferably the pen is provided at a distance from the pivot axis and a distance from the shearbolt. Further preferably the pivot axis is provided in a lower segment of the pivotable element. This ensures that when the shearbolt breaks, the pivotable element rotates downward so that the pen is displaced and therefore disengages with the hook member. Providing the pivot axis in a lower segment will have as a result, automatically due to the gravity, that the pivot element will rotate downward.

BRIEF DESCRIPTION OF THE DRAWINGS

Some embodiments of apparatus and/or methods in accordance with embodiments of the present invention are now described, by way of example only, and with reference to the accompanying drawings, in which.

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF THE DRAWINGS

The drawings are only schematic and are non-limiting. In the drawings, the size of some of the elements may be exaggerated and not drawn on scale for illustrative purposes.

Any reference signs in the claims shall not be construed as limiting the scope. In the drawings, the same reference signs refer to the same or analogous elements.

The terms "front", "rear", "forward", "rearward", "left" and "right" used throughout this description are determined with respect to the normal direction of travel of the machine in operation. However, they are not to be construed as limiting terms.

Embodiments of the present invention can be used in agricultural balers for the production of rectangular bales of agricultural material such as hay, straw, silage or similar crop material that previously has been cut, windrowed or swathed, and is picked up from an agricultural field. The produced rectangular bales may have high density, hence a high mass, for example of 500 kg or more.

Figure 1:
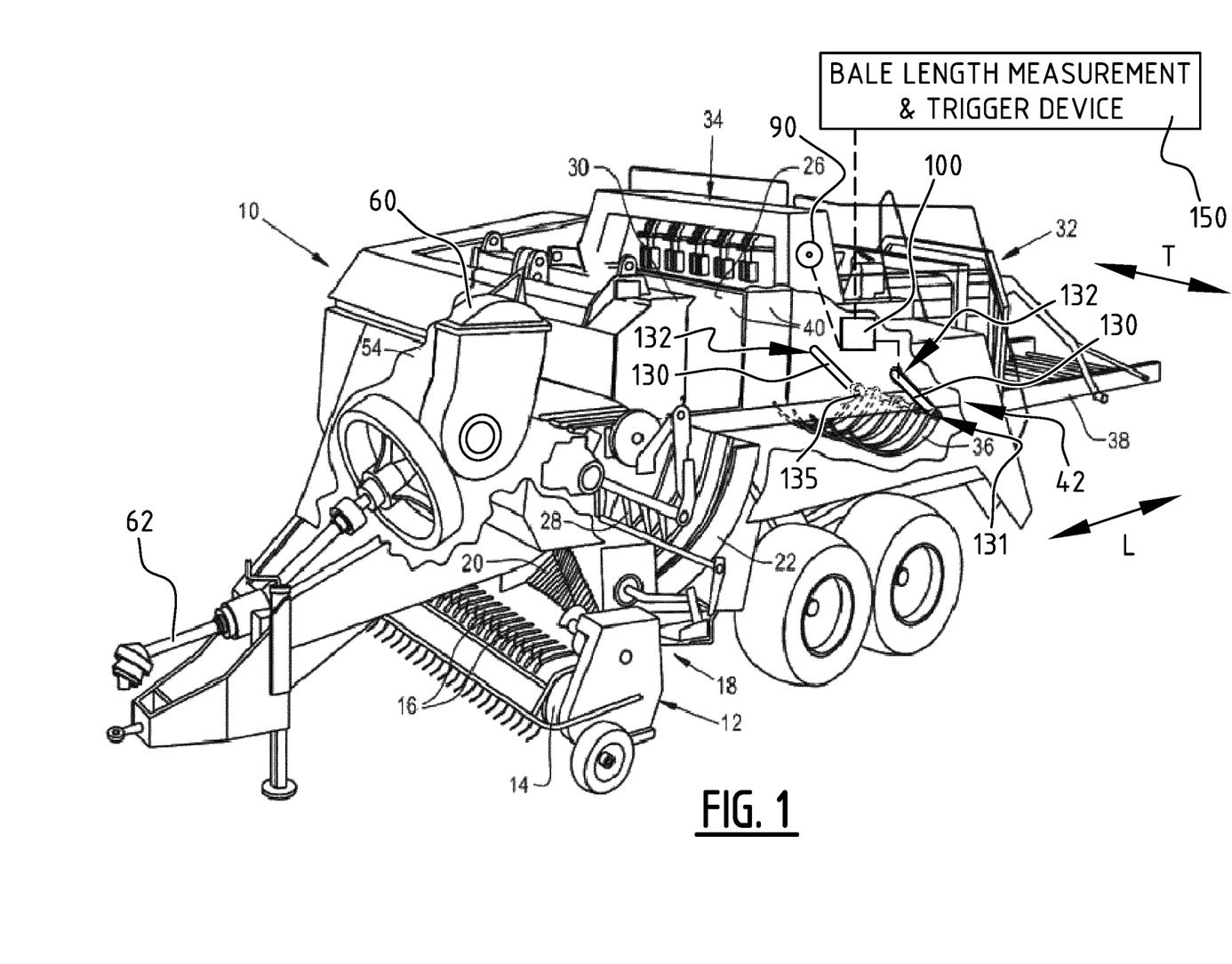
FIG. 1 is a schematic perspective view of an exemplary embodiment of a rectangular baler illustrating the context of the present invention.

Referring now to the drawings, and more particularly to FIG. 1, there is shown a schematic perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the precompression chamber 22 reaches a predetermined sensed value, a stuffer unit 24 moves the wad of crop from the pre-compression chamber 22 to a bale chamber 26. The stuffer unit 24 includes stuffer forks 28 which thrust the wad of crop directly in front of a plunger 30, which reciprocates within the bale chamber 26 and compresses the wad 20 of crop into a flake. The stuffer forks 28 return to their original stationary state after the wad of material has been moved into the bale chamber 26.

The plunger 30 compresses the wads of crop into flakes to form a bale and, at the same time, gradually advances the bale toward outlet 32 of the bale chamber 26 in a longitudinal direction L of the baler 10. The bale chamber 26 and the plunger 30 function as the second stage for crop compression. Baler 10 further comprises a needle yoke 42 with a plurality of needles 36 configured to deliver twine through the bale chamber 26 to a plurality of knotters 34. Needle yoke 42 comprises two needle support arms 130, a needle carrying rod 135 extending in the transverse direction T of baler 10 and carrying the plurality of needles 36. Each needle support arm 130 has a first end 131 and a second end 132. Needle carrying rod 135 is mounted between the first ends 131, and the second ends 132 of the needle support arms 130 are pivotally mounted around a fixed pivot axis extending in the transverse direction T of the baler.

When enough flakes have been added and the bale reaches a full or predetermined size, i.e. a predetermined length measured in the longitudinal direction L of the baler, needles 36 of needle yoke 42 bring the lower twine up around the bale through the plunger 30 and the bale chamber 26 and deliver the twine to a plurality of knotters 34 and the tying process then takes place. The plurality of knotters 34 are configured to receive the twine from the plurality of needles 36 and are mounted above the bale chamber 26. After knotting the twine is cut and the formed bale progresses through the bale chamber 26 and is eventually ejected from a discharge chute 38 while the next bale is formed. The bale chamber 26 includes a pair of side walls 40, between which the bale is formed, and between which the needles 36 extend to carry the twine through the bale chamber 26 to the knotters 34.

A gearbox 60 provides actuation of the different parts of the baler 10 that need to be actuated. Gearbox 60 may be actuated by the tractor pulling baler 10 by means of a transmission shaft 62 between the tractor and baler 10. The gearbox 60 provides a direct actuation of a plunger 30. The plunger 30 may for example be connected to the gearbox 60 by means of crank arms and pitman rods (not shown in FIG. 1).

Baler 10 shows a preferred embodiment further comprising a bale length measurement and trigger device 150 configured to measure the length of the bale in bale chamber 26 and to generate a trigger when a predetermined length is reached. The bale length measurement and trigger device 150 determines the length of the bale and provides a trigger, e.g. a mechanical trigger in the form of a moving part or an electrical trigger in the form of an electrical signal, when a predetermined length has been met. The bale length measurement and trigger device 150 may be of mechanical and/or electrical construction, or any other adequate construction. It is noted that the present invention can also be embodied without such bale length measurement and trigger device 150.

A common driving shaft 90 is used to drive the knotters 34 and the needle yoke 42. The driving shaft 90 is located above the bale chamber 26 and extends in a traverse direction T of the baler 10. The common driving shaft 90 may be suitably connected to main gearbox 60 by means of a PTO shaft and an additional gearbox (not shown). During a baling operation, the driving shaft 90 is continuously rotating at a constant rotational speed, for example a rotational speed between 250 and 350 revolutions/minute, and e.g. approximately 300 revolutions/minute. A needle coupling device 100 (shown schematically) is provided between the driving shaft 90 and the needle yoke 42. The needle coupling device 100 is configured for moving needle yoke 42 from a rest position to a twine delivery position and back, when bale length measurement and trigger device 150 generates a trigger. A further knotter coupling device (not shown in FIG. 1) is provided for coupling common driving shaft 90 with a knotter shaft carrying knotter discs of the plurality of knotters 34.

According to a first embodiment of the invention, the driving shaft 90 continuously rotates and the needle coupling device 100 comprises a mechanism to connect and disconnect the needle yoke 42 to/from the driving shaft 90 so that the needle yoke is only moved when the connection is activated. Such connect and disconnecting mechanism can be formed, as will be described hereunder, by a hook.

According to a second embodiment of the invention, the driving shaft 90 comprises a one-rotation gearbox that transmits the rotation in a discontinuous manner to the needle coupling device 100. In this embodiment, the needle coupling device 100 does not need to have a mechanism to connect and disconnect the needle yoke 42 to/from the driving shaft 90. Namely due to the one-rotation gearbox, the driving shaft 90 only transmits a single rotation to the needle coupling device 100 when the needles are to be driven.

Figure 2:
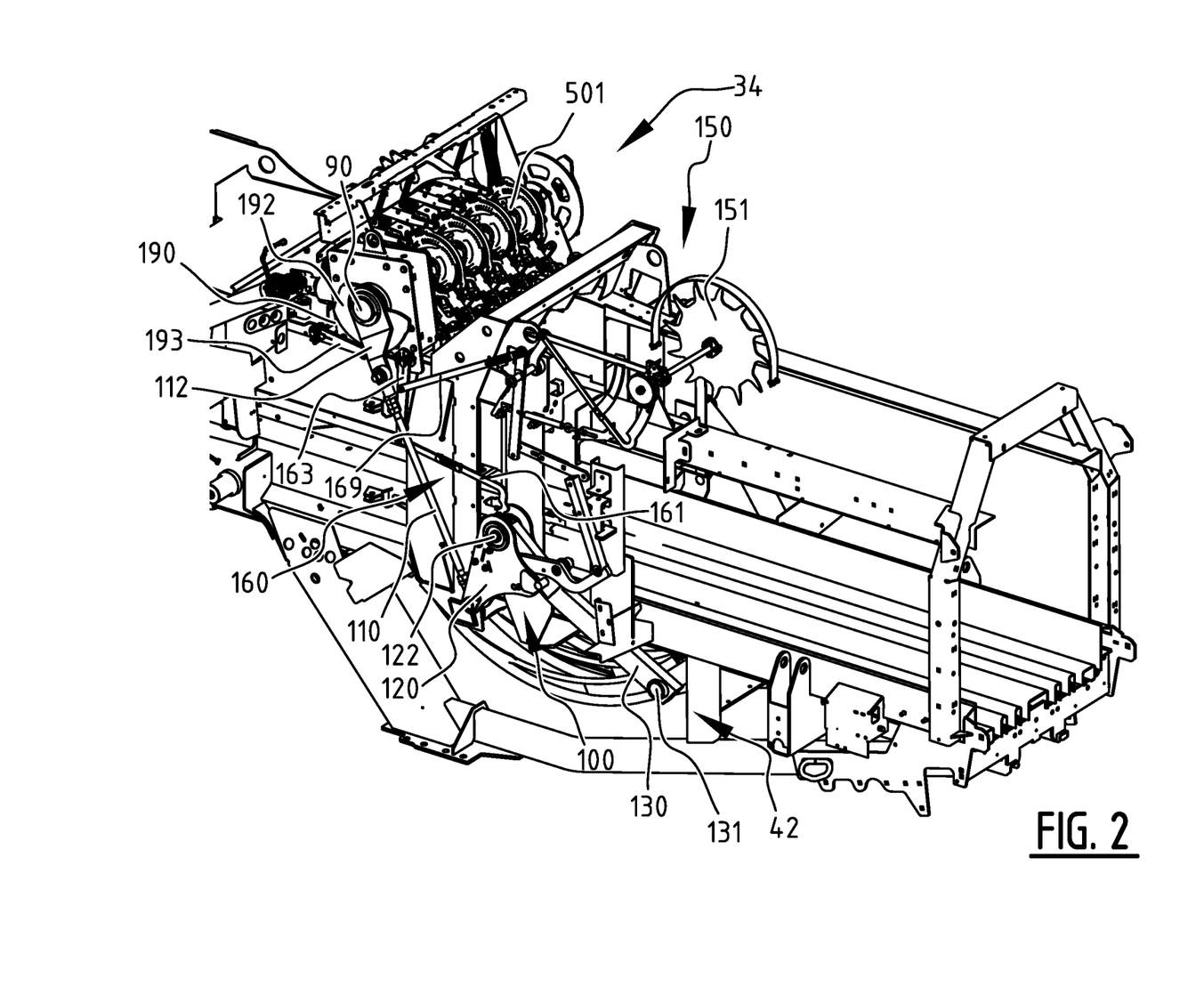
FIG. 2 is a schematic perspective view of an exemplary embodiment of a needle drive mechanism of a baler according to the present invention.
Figure 3:
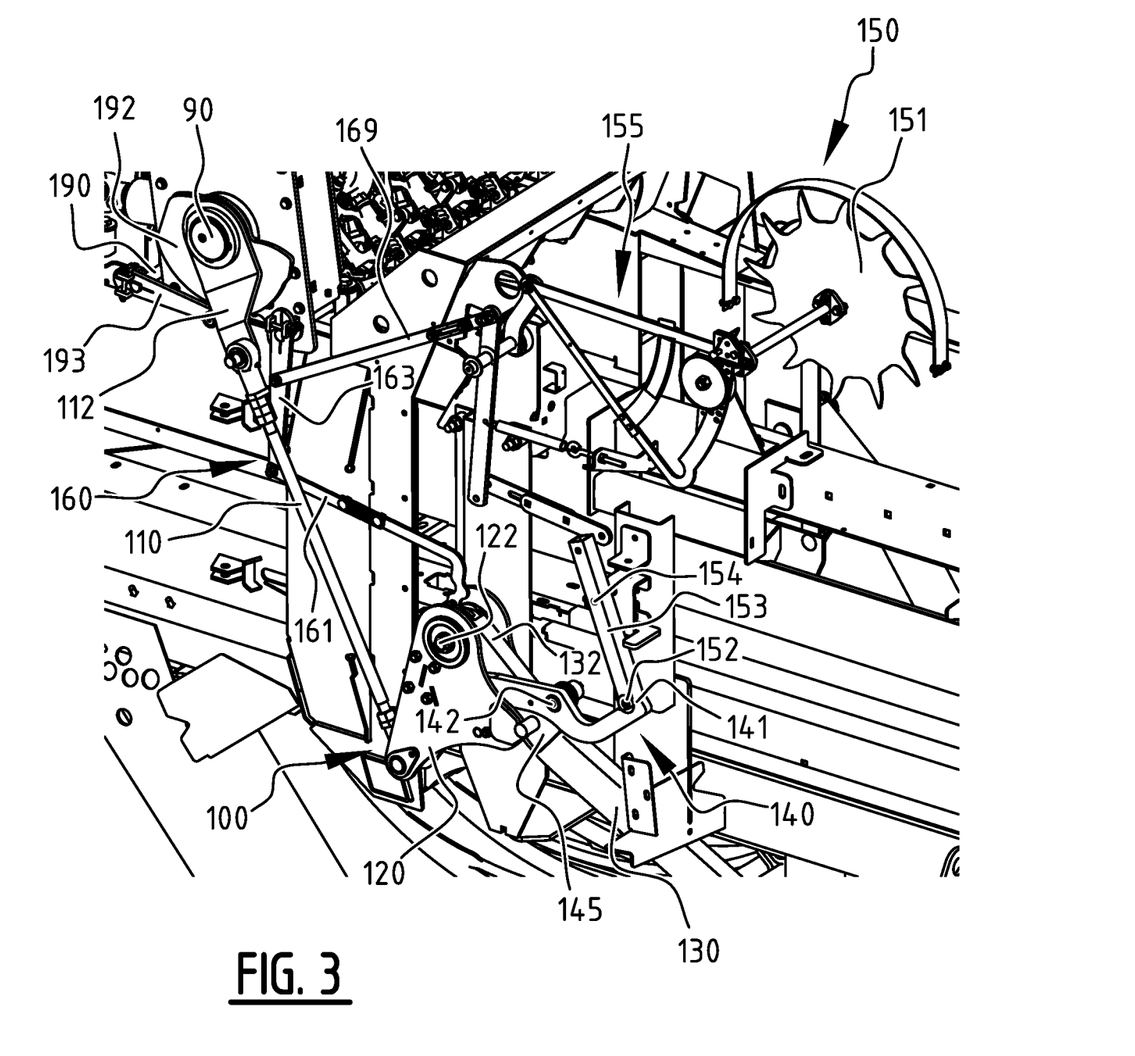
FIG. 3 is a schematic detailed view of a portion of FIG. 2.

An example of a suitable coupling mechanism, formed according to the first embodiment, is shown in FIG. 2 and FIG. 3. Needle yoke 42 comprises a needle support arm 130 pivotally connected to baler 10 about a pivot axis 122 at the second end 132 of the needle support arm 130. Typically two needle support arms 130 are provided, one at each end of the needle yoke. Needle carrying rod 135 carrying the plurality of needles 36 is not visible in FIG. 2 but may be arranged in a similar manner as in FIG. 1 between first ends 131 of the needle support arms 130.

In the embodiment of FIG. 2 and FIG. 3 the needle coupling device 100 comprises a crank arm 112 attached to the driving shaft 90 and co-rotating with the driving shaft 90; and a plurality of coupling members 110, 120, 140, 145 between crank arm 90 and needle yoke 42. The plurality of coupling members 110, 120, 140, 145 is configured for establishing a coupling between crank arm 112 and needle yoke 42 when a bale length measurement and trigger device 150 generates a trigger, as will be further elucidated below.

In operation, according to the first embodiment, driving shaft 90 with crank arm 112 is continuously rotated. Crank arm 112 is connected to a first end of a drive rod 110. A connection member 120 is pivotally mounted at a first location around pivot axis 122 extending in the transverse direction T of the baler. In this embodiment pivot axis 122 corresponds with the pivot axis of needle support arms 130, but those pivot axis could also be located at a distance of each other. A second end of drive rod 110 is connected to connection member 120 at a second location. By rotating crank arm 112, connection member 120 is swung forward and backward around pivot axis 122.

A coupler 140 (see FIG. 3 and FIGS. 4A-E) is provided for coupling and uncoupling needle support arm 130 with connection member 120 in function of a bale length measurement such that needle yoke 42 with needles 36 is in a fixed uncoupled position as long as the bale length is below a predetermined length, and such that the needle support arm 130 is coupled to swinging connection member 120 when a predetermined bale length is reached in order to swing needles 36 upward for performing knotting. In the illustrated embodiment the coupler 140 is a hook member 140 pivotally mounted around a pivot point 142. Pivot point 142 is fixedly connected to the needle support arm 130 through an attachment member 145. The hook member 140 is provided at a first end with a hook 146 (visible in FIGS. 4A, 4B and 4C) adapted to engage a pin 124 attached to connection member 120. A second end 141 of the hook member 140 is configured to cooperate with a trigger arm 153 of bale length measurement and trigger device 150. Trigger arm 153 is pivotally mounted around pivot point 154. Hook member 140 can be positioned in a first coupling position (FIG. 4B and FIG. 4C) in which the swinging connection member 120 engages the hook member 140 during swinging and in a second uncoupling position (FIGS. 4A and 4E) in which the swinging connection member does not engage the hook member 140 during swinging. Bale length measurement and trigger device 150 is configured to generate a first trigger (FIG. 4B, trigger arm 153 which has moved to the left, see further) which will position the hook member 140 in the first coupling position as the crank arm 112 is rotated (FIG. 4C), and a second trigger (FIG. 4D, trigger arm 153 which has moved to the right, see further) which will position the hook member 140 in the second uncoupling position as the crank arm 112 is rotated (FIG. 4E). The movement of trigger arm 153 from the coupling position to the uncoupling position is caused by the movement of needle yoke 42 and a trigger coupling device formed by interconnected rods 161, 163 and 169: when needle support arms 130 move, also rods 161, 163 and 169 move, pushing bale length measurement and trigger device 150 back in an uncoupling position in which trigger arm 153 is in the position illustrated in FIG. 4D and hook member 140 is uncoupled.

In prior art systems, in order to avoid that the needles break when there is an obstruction in the baling chamber, there is typically integrated a shearbolt between the PTO shaft and the drive mechanism for driving various baler components. In the illustrated embodiment, the shearbolt could be integrated in pin 124.

Figure 4A:
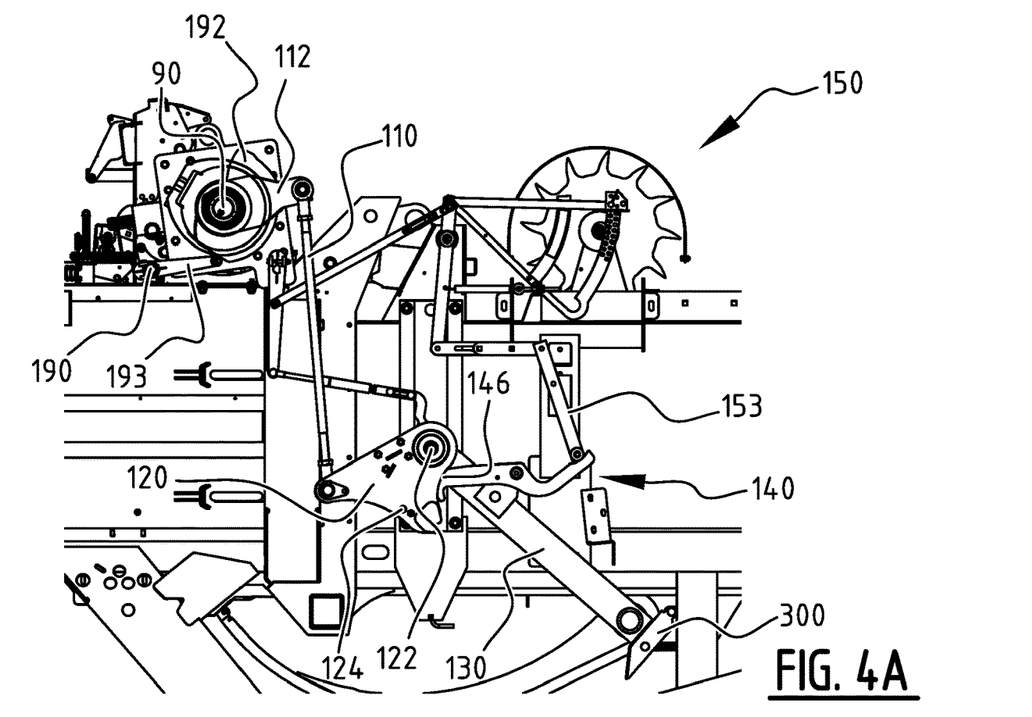
FIGS. 4A-4E illustrate consecutive positions of the various components of the needle drive mechanism of FIG. 2 during the driving of the needles.
Figure 4B:
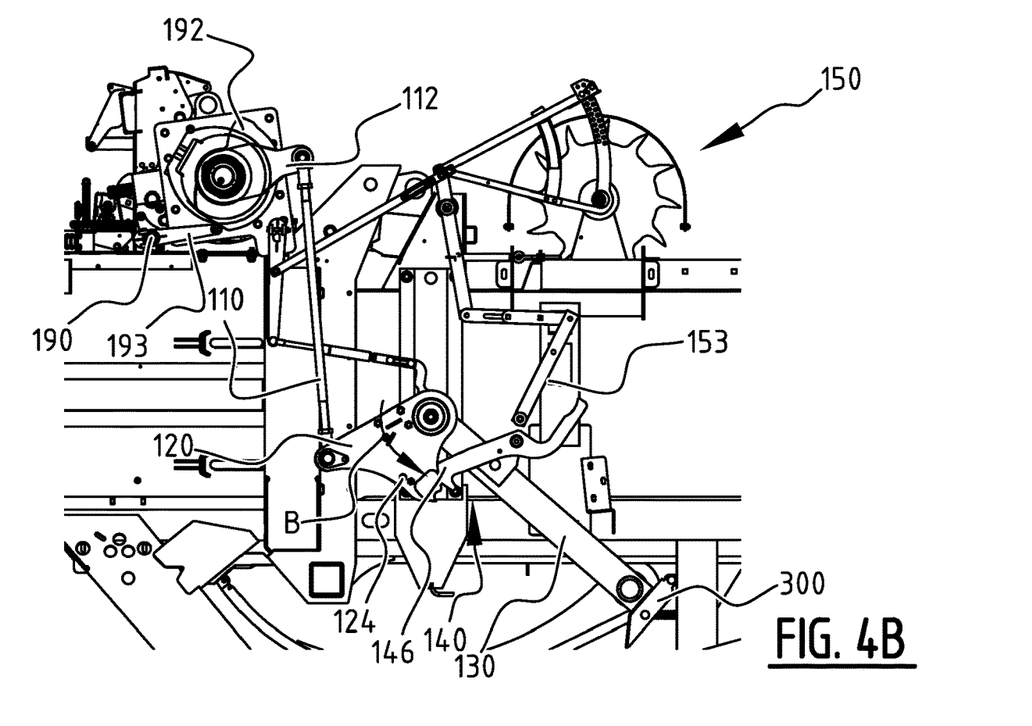
Figure 4C:
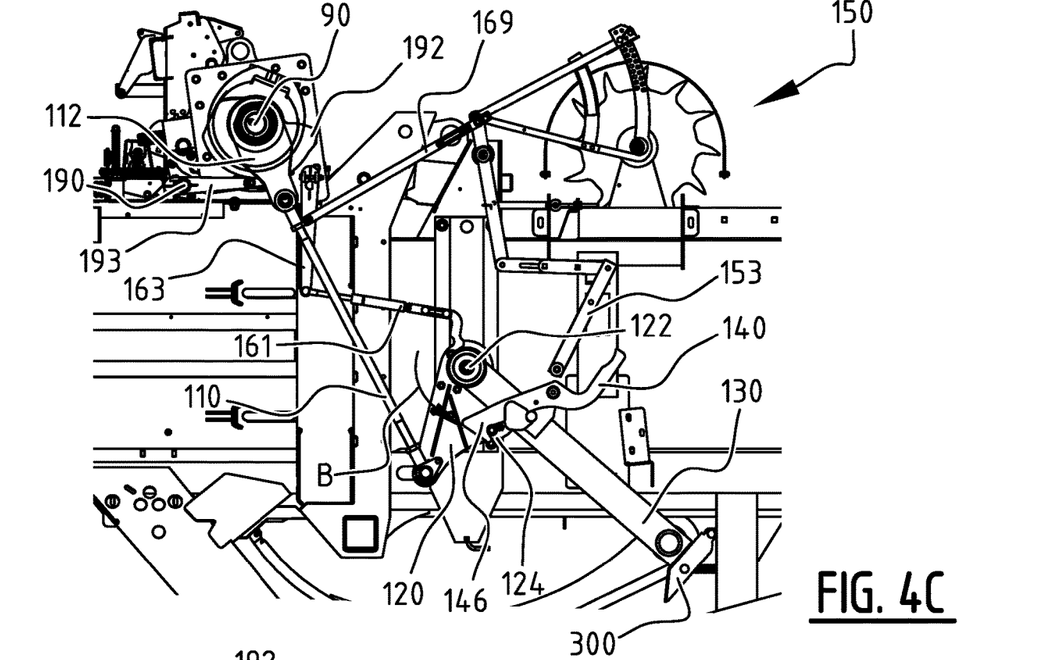
Figure 4D:
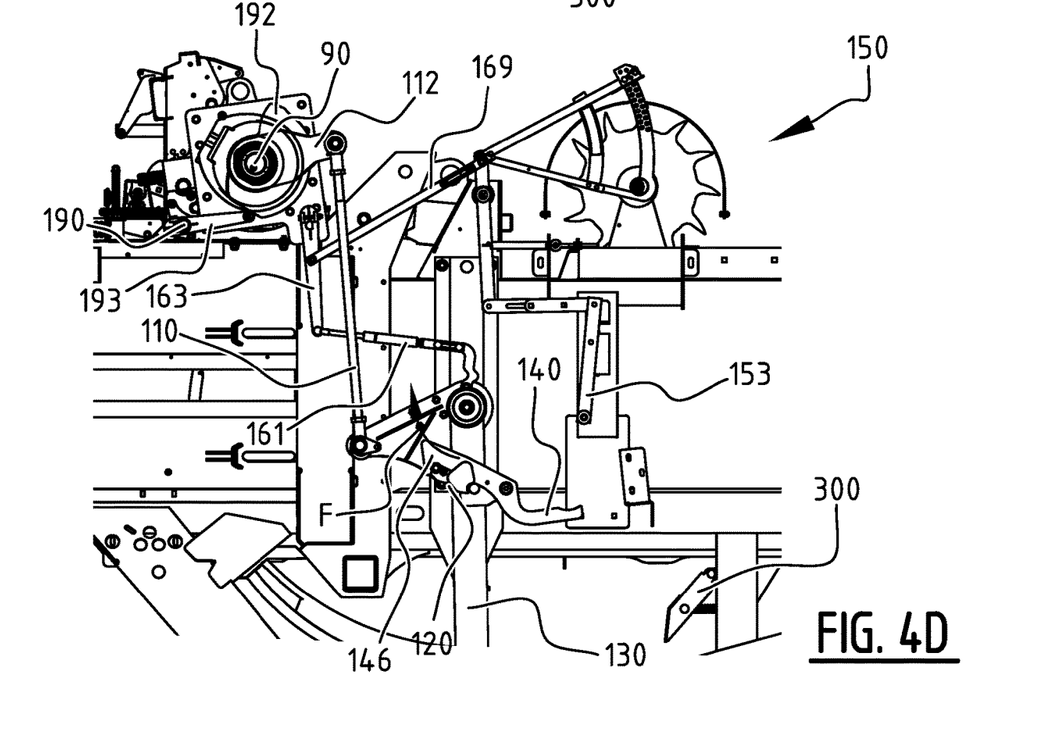
Figure 4E:
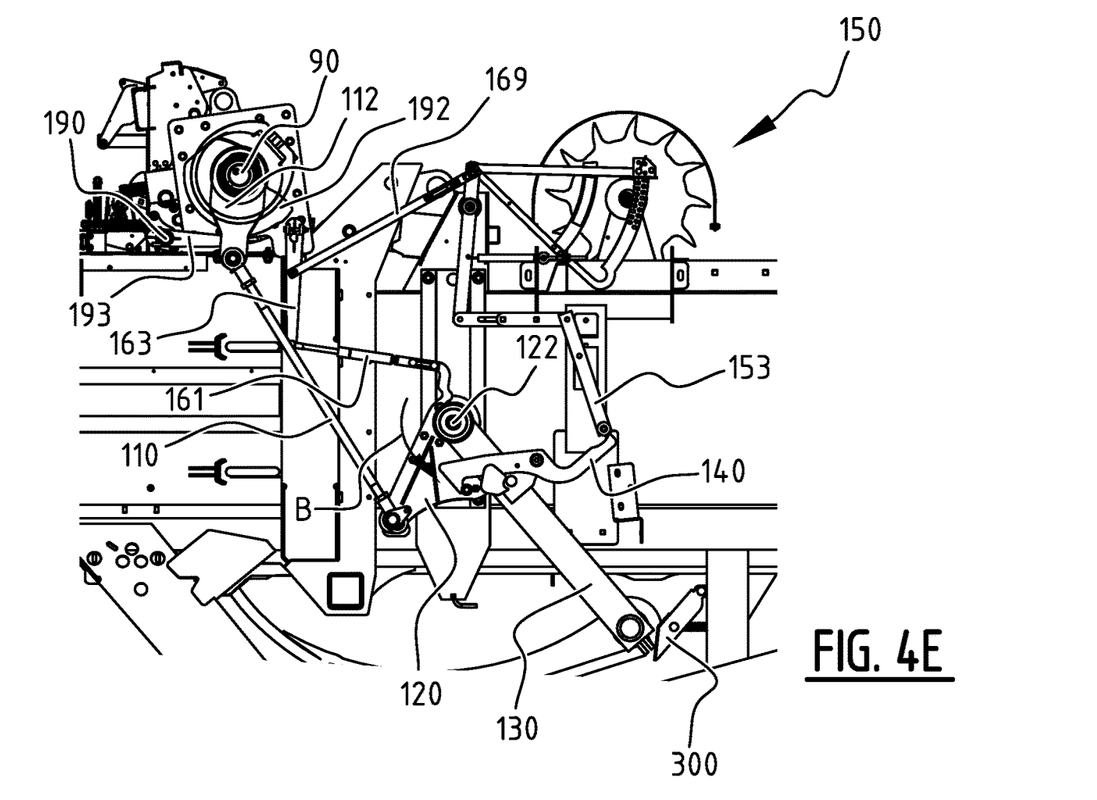
Figure 4F:
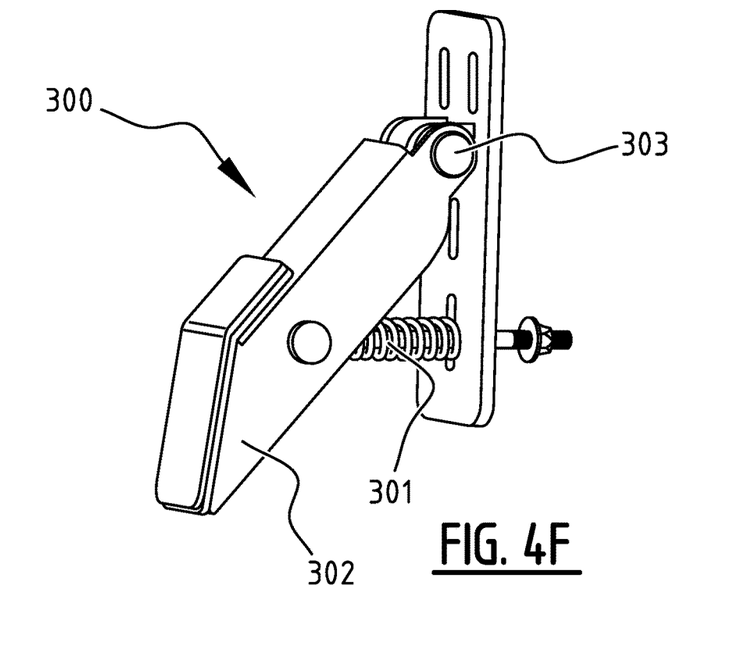
FIG. 4F is a detailed perspective view of the needle holding device shown in FIGS. 4A-4E.

To maintain the needles in the rest position (when the support arms 130 are in the uncoupled position), there is provided a holding device 300, see FIG. 4E and FIG. 4F. In the illustrated embodiment the holding device 300 comprises a compression spring 301 arranged for pressing against a holding element 302 which holds needle carrying rod 135 of needle yoke 42. The holding element 302 is pivotally mounted around pivot 303. When the hook 146 (see FIG. 4C) engages pin 124 bringing the hook member 140 in the coupling position, needle carrying rod 135 is removed from the holding element 302, i.e. the needle yoke 42 is released from the home position. This is made possible due to compression spring 301 which allows the holding element 302 to swing back and forward. When the hook 146 engages pin 124, the needle carrying rod 135 is pulled out of the holding element 302.

In the illustrated embodiment the holding device is a passive system in the sense that the needle yoke 42 is not actively released when needle movement is required. However, a skilled person understands that it is also possible to provide an active system releasing the needle yoke 42 upon reaching a predetermined bale length.

The operation of the needle coupling device 100 is illustrated in FIGS. 4A-4E. FIG. 4A shows the position of the trigger arm 153 before the predetermined bale length is reached. In this position trigger arm 153 maintains hook member 140 in a position in which hook 146 is not coupled to pin 124. In the illustrated embodiment the trigger arm is provided at an end with a wheel 152 which presses hook member 140 downward as long as the predetermined bale length is not reached. This corresponds with the situation in which the needles 36 are in a retracted stationary position. When the predetermined bale length is reached the bale length measurement and trigger device 150 swings the trigger arm 153 around pivot point 154 such that the hook member 140 is released and the hook 146 can engage pin 124 as the connection member 120 is pivoted backward by drive rod 110, see arrow B in FIG. 4B and FIG. 4C. Needle support arm 130 is now connected to the connection member 120 through hook 146 and the connection member 120 together with needle support arm 130 swings forward, see arrow F in FIG. 4D to move the needles 36 in the direction of the knotters 34 in order to deliver twine to the knotters 34. Next, trigger arm 153 is moved back to the uncoupling position. The movement of trigger arm 153 from the coupling position (FIGS. 4B and 4C) to the uncoupling position is caused by the movement of needles 36: when needles 36 have been rotated over a predetermined range, causing a movement of coupling rods 161, 163 and 169, bale length measurement and trigger device 150 is moved back in an uncoupling position in which trigger arm 153 is in the position illustrated in FIG. 4D and hook member 140 is uncoupled. When the connection member 120 is swung backward again, see arrow B in FIG. 4E the hook 146 is released and the needle support arm 130 is held again in the stationary retracted position.

In a preferred embodiment bale length measurement and trigger device 150 comprises a star wheel 151 configured to rotate as a bale in the bale chamber 26 moves in a longitudinal direction L of baler 10, and a linkage assembly 155 coupled to star wheel 151. Linkage assembly 155 comprises the pivotally mounted trigger arm 153 arranged to trigger a movement of the coupler 140 from an uncoupled position to a coupled position and back. The figures show a particular embodiment of a linkage assembly 155 but the skilled person understands that many variants thereof are possible within the context of the present invention. In an alternative embodiment (not shown), instead of a trigger arm 153 and linkage assembly, the bale length measurement and trigger system 150 may comprise an actuator which is adapted to push the hook member 140 in an engaging position when the desired bale length has been reached.

FIGS. 2 and 3 further illustrate an embodiment of a knotter coupling device 160 between the driving shaft 90 and a drivable knotter shaft, on which a plurality of knotter discs of the plurality of knotters 34 are mounted. Knotter coupling device 160 is configured to couple the driving shaft 90 to the drivable knotter shaft based on a position of the needle yoke 42. Knotter coupling device 160 illustrated in the drawings comprises a rod assembly configured for engaging the clutch such that the driving shaft 90 is coupled to the knotter shaft. This coupling can be made by the skilled person based on the requirements of the connection. A detailed description of possible embodiments of the knotters can be found in WO2014/060245 and WO2015/014616 in the name of the applicant, which are included herein by reference.

When the needles 36 are moved upward, see the description above, the needles carry with it a strand. As the needles 36 approach the knotters 34, the tucker arms are also moved upward. The tuckers arms may be moved synchronously with the needles 36. This can be achieved through a tucker arm coupling system in the form of a cam system with a cam 192 co-rotating with drive shaft 90 and a cam roller 193 secured to tucker arm shaft 190, see FIG. 2 and FIG. 4A-4E. The tucker arms rock upwardly to provide the slack necessary in the strand to accommodate the needle movement. The tip of each needle 36 snares the strand delivered by the corresponding tucker arm 195 and presents the strand delivered by the needle 36 together with the strand delivered by the corresponding tucker arm 195 in unison to the knotter 34. See also FIG. 6C of WO2015/014616 and the corresponding description.

Using an exemplary embodiment of the needle coupling device 100 and the knotter coupling mechanism 160, the following advantages may be achieved. The needle coupling device 100 ensures that the needles 36 move up the lower and the upper twine into the knotter 34, when the desired bale length is reached. Then, through the knotter coupling mechanism 160, at the right time the knotter discs 501 begin to rotate. Compared to prior art knotters exemplary embodiments of the invention include a major change to the drive line of the knotters 34, in the sense that the needles 36 must come up before the knotter discs 501 begin to rotate. At the beginning of the knotter cycle, like a standard knotter, the first knots are made. The knotter discs 501 continue to rotate and the second knot is made (loop knot or standard knot, depending from the twine disc and the other knotter parts). The knotter discs 501 continue to rotate and a third billhook rotation is made. In that manner it is ensured that the billhook opens, just like for the first and the second rotation. The billhook is pushed open on a billhook cam follower. The description of a billhook cam follower is included by reference to WO2014/060245 and WO2015/014616. In that manner it is guaranteed that the second knot is released out of the billhook. Using such a configuration, the billhook tension does not have to be a compromise anymore. The tension can be set sufficiently hard to achieve a perfect first knot and a perfect second knot, whilst avoiding the risk that the second knot stays on the billhook.

Figure 5:
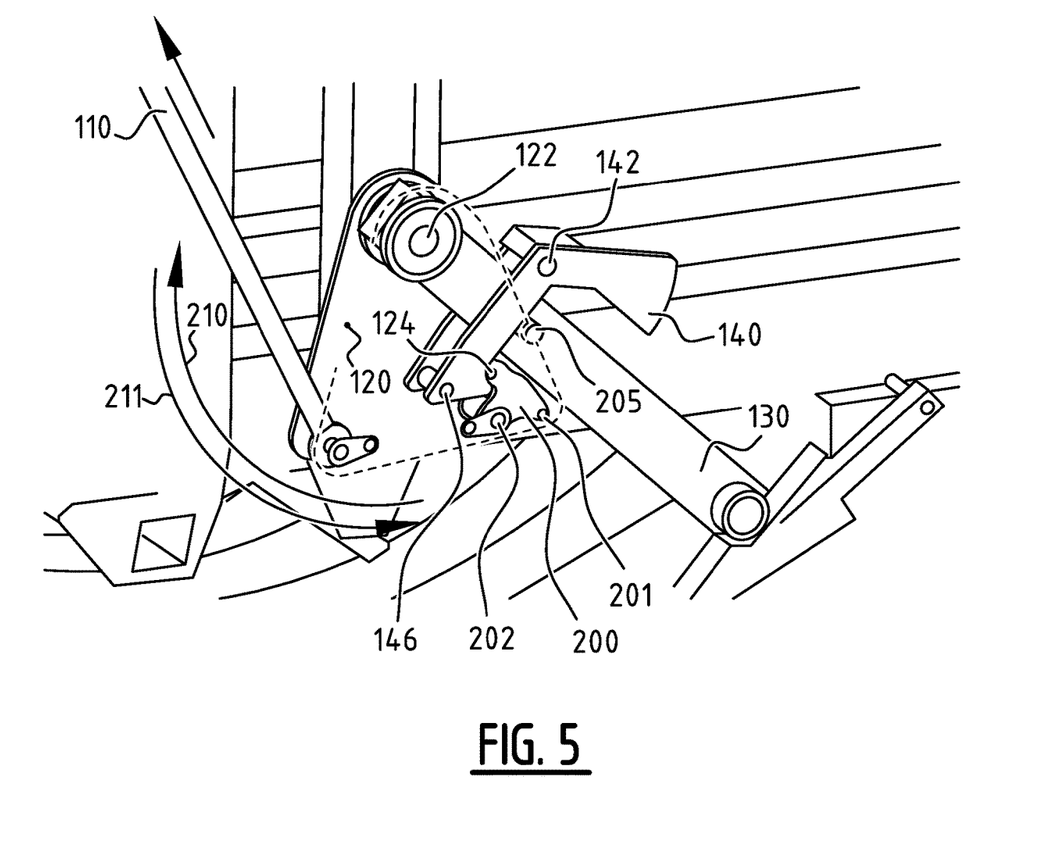
FIG. 5 is a schematic perspective view of an exemplary embodiment of a needle drive mechanism of a baler according to the present invention.
Figure 6:
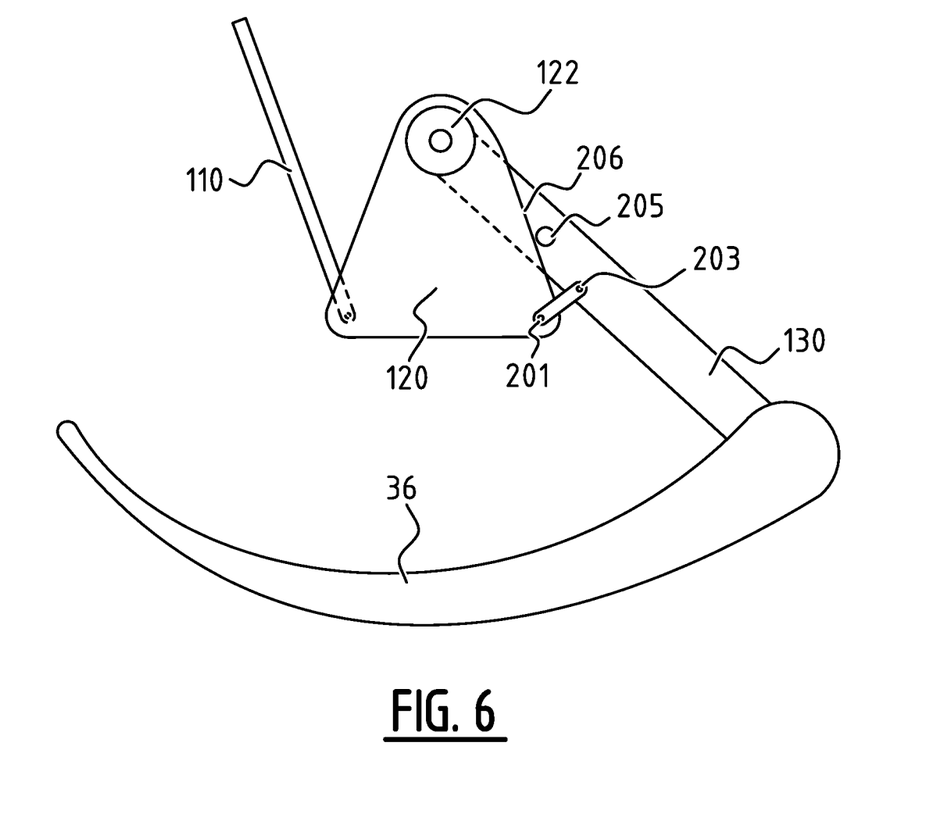
FIG. 6 is a schematic side view of a further exemplary embodiment of a needle drive mechanism of a baler according to the present invention.

FIGS. 5 and 6 show further embodiments of the present invention. In particular, FIGS. 5 and 6 show the connection member 120, the needle support arm 130 and the interconnection between the connection member and the needle support arm. As described above, the connection member 120 is mounted to rotate around the same pivot axis 122 as the needle support arm 130. The connection member 120 is further connected to the driving shaft 90 via drive rod 110, as is described above. FIG. 5 shows an embodiment wherein the driving shaft 90 and drive rod 110 may be directly connected to the connection member 120 such that, when the driving shaft rotates, the connection member 120 continuously makes a swinging movement. The connection member 120 is engageable and disengageable from the needle support arm so that the needle support arm 130 can be moved in a discontinuous manner while the connection member 120 continuously swings. In the embodiment of FIG. 6, it is assumed that the driving shaft 90 is connected to the drive rod 110 and connection member 120 via a one-rotation gearbox such that the connection member 120 makes a discontinuous swinging movement corresponding to the desired discontinuous movement of the needle support arm 130. Such one-rotation gearbox allows the interconnection between the connection member 120 and the needle support arm 130 to be rigid.

FIG. 5 shows that needle support arm 130 is connected to a hook member 140 via a pivot point 142. As described above, the hook member is rotatable between an engaging and a disengaging position. FIG. 5 shows the hook member in the engaging position. The hook member 140 has a hook 146 that is adapted to hook behind, thereby to abut against, a pin 124. The pin 124 is mounted to the connection member 120 such that, when the hook 146 hooks behind the pin 124, the hook member 140 interconnects the needle support arm 130 and the connection member 120. In such state, the needle support arm 130 moves along with the connection member 120. In the embodiment described above, the pin 124 is formed as a shearbolt. In the embodiment of FIG. 5, the pin 124 is formed on a pivotable element 200.

The pivotable element 200 is pivotally mounted to the connection member 120 via a pivot axis 202. Rotation of the pivotable element 200 around the pivot axis 202 is prevented by a shearbolt 201. The shearbolt interconnects the pivotable element 200 and the connection member 120 at a distance from the pivot axis 202. The pin 124 is located on the pivotable element 200 such that, when the shearbolt is intact, the element 200 has a predetermined relative position with respect to the connection member 120. The shearbolt can be dimensioned such that when an overload occurs at the needles 36, the shearbolt 201 breaks and the pivotable element 200 rotates with respect to the connection member 120 thereby disengaging the hook 146 from the pin 124. This stops the further movement of the needle support arm 130 while the connection member 120 can continue its swinging movement. In this way, overload at the driving shaft can be prevented. Furthermore, a sensor could be provided to detect breaking of the shearbolt 201.

As described above, locating the shearbolt 201 on such pivotable element 200 has the advantage that mounting or replacing a shearbolt 201 can be done in any position of connection element 120, irrespective of the relative position to the needle support arm. In this context it is noted that this is not the case in the embodiment of FIG. 6, where the needle support arm 130 and the connection member 120 have to be in a predetermined relative position to be able to mount or replace a shearbolt 201.

While the hook member 140 and the pin 124 are particularly provided for transferring a force for moving the needle support arm 130 in the forward direction, a protrusion 205 and abut surface 206 is provided for transferring a force to move the needle support arm 130 in the backward direction. In this context, forward direction corresponds to a movement of the needle support arm 130 around pivot axis 122 from a retracted position of the needle 36 to a twine delivery position of the needle 36. A backward movement corresponds to a rotation of the needle support arm 130 around pivot axis 122 from a twine delivery position of the needle 36 to a retracted position of the needle 36. These movements are described above. In FIG. 5, the forward movement is illustrated with arrow 210 and the backward movement is illustrated with arrow 211.

FIG. 5 shows the needles in the retracted position. The protrusion 205 and the abut surface 206 interact independent from the hook member 140 and the pin 124. This is particularly relevant when the shearbolt 201 breaks and the engaged hook 146 disengages from the pin 124. Such breaking typically occurs in a position where the needles are not in the retracted position. In such situation, the connection member 120 will continue its swing in the forward direction, followed by continuing its swing in the backward direction. During swinging in the backward direction, the protrusion 205 will abut against the abut surface 206 thereby taking the needle support arm 130 along in the backward direction. As such, the needle support arm 130 and the needles 36 are automatically retracted. This prevents possible damage, as is described above.

In the embodiment of FIG. 5, the protrusion 205 is formed at the needle support arm 130 and the abut surface 206 is formed at the connection member 120. The skilled person will understand that this can also be built the other way around, wherein the connection member 120 comprises the protrusion, which is located to abut against an abut surface at the needle support arm 130 during the backward movement of the connection member 120.

The pivot element 200 is fixed with respect to the connection member 120 via a shearbolt 201. It is further connected to the connection member via a pivot axis 202 which is preferably located in a lower region of the pivot element 200. The pin 124 is preferably located in an upper region of the pivot element 200. Such configuration has the advantage that when the shearbolt 201 breaks, gravity will inflict a rotation of the pivotable element 200 thereby automatically rotating the pivotable element 200 downward and thereby disengaging the pin 124 from the hook 146.

FIG. 6 shows a further alternative embodiment wherein a rigid connection is provided between the needle support arm 130 and the connection member 120 via alternative connection element 203. This connection element 203 can be interconnected with the connection member 120 via a shearbolt 201. Furthermore, a protrusion 205 and an abut surface 206 can be provided at the needle support arm 130 and the connection member 120 to enable automatic retraction of the needle support arm and needles when the shearbolt 201 breaks. This embodiment has the same advantages in term of operation and safety as the embodiment of FIG. 5. Namely, there is a direct relation between the force on the shearbolt 201 and the force exerted on the needles 36 so that the needles can be correctly protected. Furthermore there is an automatic retraction of the needles from the baling chamber in case the shearbolt 201 breaks. A disadvantage of the embodiment of FIG. 6 is that a predetermined relative position between the connection member 120 and the needle support arms 130 is required to mount or replace the shearbolt 201.

Figure 7:
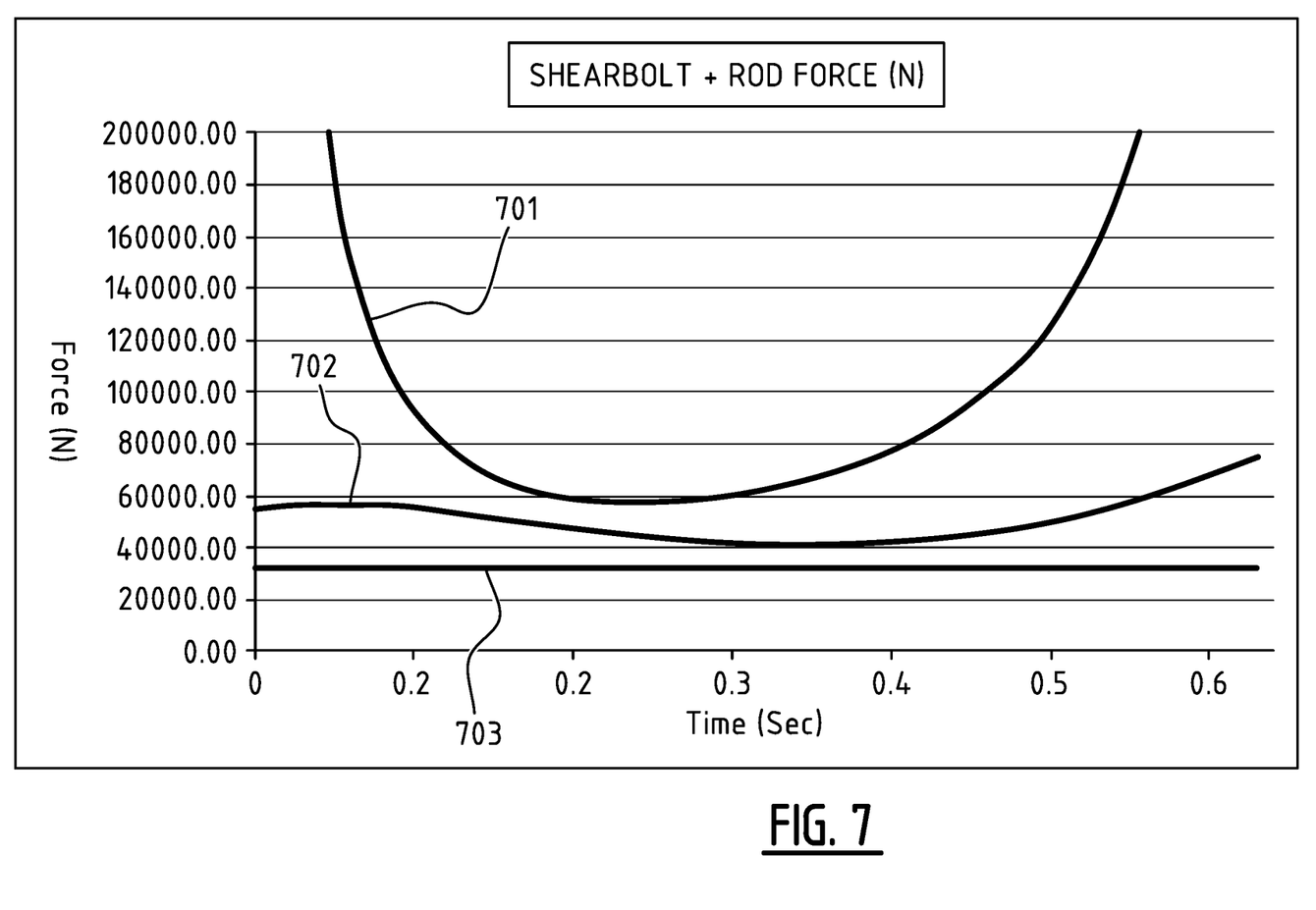
FIG. 7 shows in a graph the effect of the position of the shearbolt.

FIG. 7 shows the effects of the location of the shearbolt in the mechanism. The figure shows on the horizontal axis the time passing during a single rotation of the driving mechanism and on the vertical axis the force to be exerted by the needles to break the shearbolt. When the shearbolt is placed between the PTO and the driving shaft 90, line 701 applies. Because the driving shaft 90 is connected to the needles via a crank arm 112, so-called dead points in the leverage have as a result that the force to be exerted on the needles to break the shearbolt is enormous. This is a dangerous situation since the shearbolt will not break when the needles are blocked. Placing the shearbolt in the drive rod 110 leads to line 702. The skilled person will realise that this is a better situation than line 701. However still there is a large fluctuation, depending on the position in the cycle, in force required at the needles to break the shearbolt. In the position according to the invention, there is a direct and constant ratio, independent from the position in the cycle, to break the shearbolt. This is illustrated by line 703.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. A baler comprising:
    a bale chamber;
    a plunger configured to compress crop material in the bale chamber in order to form a bale;
    a needle yoke rotatable around a fixed pivot axis and comprising a plurality of needles configured to deliver twine through the bale chamber;
    a plurality of knotters configured to receive the twine from the plurality of needles;
    a driving shaft located above the bale chamber and extending in a traverse direction of the baler;
    a needle coupling device configured to convert a rotation of the driving shaft into a movement of the needle yoke from a rest position to a twine delivery position and back, the needle coupling device comprising:
        a crank arm attached to the driving shaft and co-rotating with the driving shaft;
        a drive rod having a first end pivotally connected to the crank arm and having a second end;
        a connection member pivotally mounted around the fixed pivot axis and pivotally connected at a second location to the second end of the drive rod such that rotation of the driving shaft is converted in a swinging of the connection member around the fixed pivot axis, the swinging corresponding to the movement of the needle yoke,
    wherein the connection member is cooperative with the needle yoke by:
        a shearbolt adapted to transfer a force from the connection member to the needle yoke during a movement from the rest position to the twine delivery position; and
        a protrusion, formed at one of the connection member and the needle yoke, to abut against the other one of the connection member and the needle yoke during a movement from the twine delivery position to the rest position.

2. The baler according to claim 1, wherein the needle coupling device further comprises a coupler configured to couple the connection member to the needle yoke via the shearbolt.

3. The baler according to claim 2, wherein the coupler is a hook member which is positionable in a first coupling position in which the swinging connection member engages the hook member during swinging and in a second uncoupling position in which the swinging connection member does not engage the hook member during swinging.

4. The baler according to claim 2, wherein the coupler is attached to the needle yoke.

5. The baler according to claim 2, wherein a pin is mounted to the connection member, wherein the coupler is adapted for engaging with the pin in the first coupling position of the hook member.

6. The baler according to claim 5, wherein the pin is located on a pivotable element pivotably connected to the connection member via a pivot axis, wherein the shearbolt is provided, at a distance from the pivot axis, to interconnect the pivotable element and the connection member.

7. The baler according to claim 6, wherein the pin is provided at a distance from the pivot axis and at a distance from the shearbolt.

8. The baler according to claim 6, wherein the pivot axis is provided in a lower segment of the pivotable element.

* * * * *